3,605,492
Patented Sept. 20, 1971

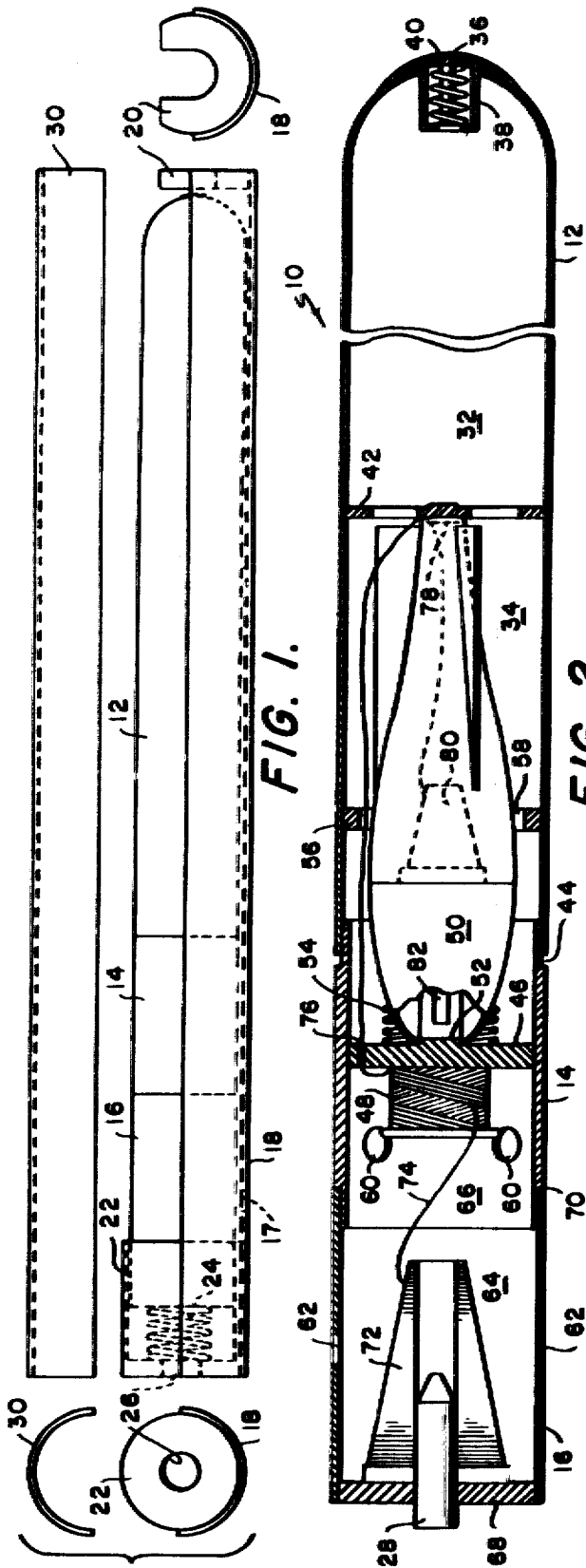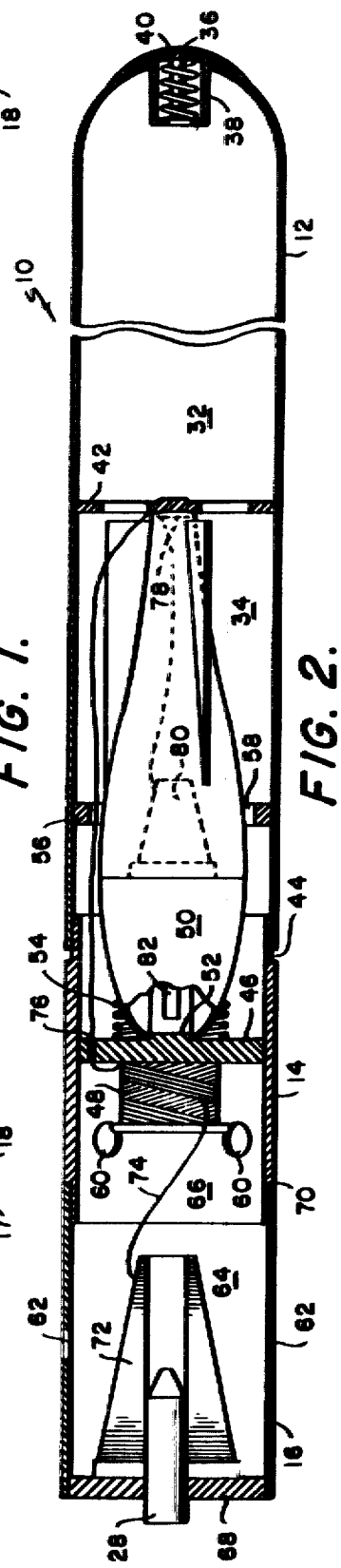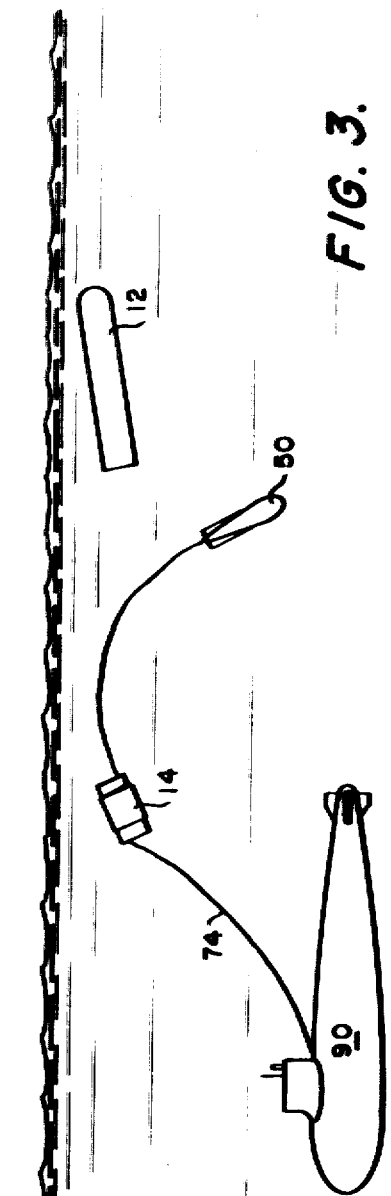

3,605,492
PREASSEMBLED MODEL SXBT FLOTATION DEVICE
George D. Stohrer, John H. Cawley, Richard P. Berthiaume, and Daniel Schiff, Bowie, Md., assignors to the United States of America as represented by the Secretary of the Navy
Filed Mar. 26, 1970, Ser. No. 22,939
Int. Cl. G01n *33/18, 1/00*
U.S. Cl. 73—170A      9 Claims

ABSTRACT OF THE DISCLOSURE

Apparatus for containing and releasing an expendable probe for measuring various properties of water. The probe is releasably attached to a buoyant cannister and contains sensing elements which are connected with instrumentation aboard a submerged launch vehicle.

---

The invention described herein may be manufactured and used by or for the Government of the United States of America for governmental purposes without the payment of any royalties thereon or therefor.

BACKGROUND OF THE INVENTION

The invention relates generally to a method and apparatus for indicating underwater ocean characteristics and more particularly to an apparatus for obtaining a temperature profile in the ocean from an underwater vessel such as a submarine.

It is known that in large bodies of water, considerable variations in temperature with respect to depth exist which can be detrimental to the operation of underwater acoustical equipment. Consequently, it is desirable to use sea water temperature gradients to prepare a sound velocity profile for selected areas in the ocean so that the performance of underwater equipment, such as sonar systems, can be predicted.

In prior art devices the sound velocity profile measurements are made by hull mounted velocimeters which record the ocean characteristics as the submarine traverses a depth interval from near the surface to at most the maximum operating depth of the vessel.

Performing a depth excursion, however, is often disadvantageous since it may degrade the combat readiness and communication effectiveness of the submarine as well as to expose it to the best depth for detection by surface ships.

Other prior art devices provide a weighted body member having temperature sensing elements exposed to the ambient water. The rate at which the body falls through the water is a known constant and by plotting the sensed temperature versus time of fall an accurate sound velocity profile can be obtained. The member shown and described in U.S. Pat. No. 3,339,407 is exemplary of such prior art devices.

SUMMARY OF THE INVENTION

The invention described herein provides apparatus for storing an expendable sensor probe and for launching the probe from a submerged vehicle and carrying it to the water surface by a buoyant float member. The sensor detects the specific properties of the water and transmits the measurements to the vehicle by means of an electrical conductor connected between the probe and the vehicle. Since the rate of fall of the probe body through the water is known, measurements made by the sensor may be correlated with water depth and a sound velocity profile may be obtained aboard the submarine.

The invention provides for an additional wire spool to be carried by the float member which, coupled with a wire spool remaining within the launch device, decreases the wire drag on the float as it ascends toward the surface of the ocean.

Additionally, the invention provides means for automatically flooding the chamber of the float member at or near the water surface and for releasing the probe so that it descends through the water under the influence of gravity.

Accordingly, it is an object of the present invention to provide a device for measuring subsurface ocean characteristics.

It is a further object of the invention to provide an expendable sensing device, releasable from a submarine, for obtaining a sound velocity profile.

Another object of the invention is to provide a device which may be launched from a submarine and which carries a sensing probe to the water surface.

Still another object of the invention is the acquisition of acoustic information by a submarine over a wide range of ocean depths without requiring a change in depth by the submarine.

Other objects, advantages, and novel features of the invention will become apparent from the following detailed description of the invention when considered in conjunction with the accompanying drawings wherein:

BRIEF DESCRIPTION OF THE DRAWINGS

FIG. 1 is an illustration showing the probe assembly and the launching envelope assembly;

FIG. 2 is an illustration partly in cross section, showing the expendable probe assembly;

FIG. 3 is a schematic diagram showing the operation of the invention.

DESCRIPTION OF THE PREFERRED EMBODIMENT

The novel features of the submarine expendable bathythermograph (SXBT) assembly includes: (1) a tubular casing within which the SXBT is enclosed and protected from damage during launch from a submarine; (2) a mechanism for releasing the SXBT from a flotation chamber at a prescribed water depth and for flooding the flotation chamber to thereby cause the chamber to sink; (3) an auxiliary spool of wire provided within the tubular casing for the purpose of permitting the achievement of greater overall launch depth capability and instrument depth while recording a sound velocity profile; and (4) a light weight, half-sleeve storage chamber which is employed to permit long-term dry storage of the SXBT and reliable triggering when the device is launched from a submarine.

Referring more specifically to FIGS. 1 and 2, the SXBT assembly 10 is shown to comprise three interconnecting sections: a buoyancy tube 12; an auxiliary wire cannister tube 14; and a submarine cannister tube 16.

In storage and in the submarine launch mechanism (not shown) the SXBT assembly is held firmly together by a half-sleeve envelope assembly 18 having a forward wall portion 20 and a rearward receiving cup 22.

A spring element 24 is disposed in the receiving cup 22 and functions to press the SXBT 10 against the forward wall 20 to thereby releasably secure the SXBT in the envelope assembly.

An opening 26 is provided in the bottom of the receiving cup 22 to permit the SXBT and the envelope assembly to be positioned on a connector plug 28. The connector plug is permanently attached to the submarine launching mechanism and provides an electrical connection between the SXBT probe and recording instruments (not shown) within the submarine.

A cover member 30 is provided for the half-sleeve envelope 20. The cover is used only while the SXBT probe assembly is in storage and is removed before the half-sleeve envelope containing the SXBT assembly is placed in the submarine launch mechanism.

As shown in FIG. 2, the buoyancy tube 12 comprises a flotation chamber divided by a perforate wall 42 into two portions 32 and 34. The forward portion 32 includes a valve cap 36 which after launching is adapted to be opened at a prescribed water depth by the force of a compression spring 38. In dry storage, the valve cap is retained in a closed position by a water soluble paper seal 40. When the buoyancy tube is launched from the submarine, the paper seal 40 dissolves in the water and the valve cap 36 is retained in place by the ambient water pressure. The spring 38 is designed to release the valve 36 when the water pressure drops to a predetermined level. The auxiliary wire cannister 14, shown in FIG. 2, is releasably fitted against a gasketed open end 44 of chamber portion 34. A release plate 46 is securely positioned within the wire cannister 14. An auxiliary wire spool 48 is fixedly attached to the release plate 46 on a side away from the chamber portion 34.

An expendable sensor probe 50, similar in design to the oceanographic probe described in the aforementioned U.S. Pat. No. 3,339,407, is located within the chamber 34 between the perforate wall 42 and the release plate 46 as shown in FIG. 2. The nose portion of probe 50 is disposed over a support stud 52 on the release plate 46. A release spring 54 is positioned between the release plate 46 and the nose of probe 50.

In the assembled condition, illustrated by FIG. 2, the spring 54 is under compression and serves to:
(1) Secure the probe in position within the buoyancy tube 12; and
(2) Force the auxiliary wire cannister 14 away from the buoyancy tube at a predetermined depth below the ocean surface in a manner to be hereinafter described.

It has been found desirable to include a centering ring 56 which is fixedly attached on an inside surface of the buoyancy tube 12 and within the chamber portion 34. The centering ring 56 includes an opening 58 having a diameter sufficiently large to loosely accommodate the sensor probe 50. The ring 56 is employed to facilitate assembly of the SXBT unit by centering the probe 50 within the chamber 34 in a position to be engaged by the support stud 52.

The portion of the wire cannister tube 14 which contains the auxiliary wire spool 48 is shown in FIG. 2 to contain a plurality of ports or openings 60. Similar openings or ports 62 are provided in the submarine cannister tube 16.

At launch depth, the cover 30 is removed from the SXBT envelope assembly 18. The SXBT and its envelope assembly is then inserted into a submarine launch mechanism (not shown) and the envelope assembly and submarine cannister tube are positioned on a stud (not shown) integral to the launch mechanism. The stud projects through a positioning slot 17 of the envelope assembly 18. The SXBT package 10 is then manually positioned by compressing the spring element 24 and causing the positioning stud to also project through a cannister port 62, thus mechanically securing the submarine cannister tube 16 and envelope assembly 18 to the launch mechanism (not shown). Concurrently, a spring-loaded electric solenoid operated piston (not shown) attached to the launch mechanism presses firmly against the valve cap 36 thus holding the complete SXBT package securely in the launch mechanism.

To launch the SXBT the launch mechanism, containing the SXBT package, is inserted into a submarine signal ejector tube (not shown). Sea water at ambient pressure is admitted to the signal tube and freely enters the cannister areas 64 and 66 through ports 62 and 60. The pressure of the water against the release plate 46 forces the wire cannister tube 14 into sealing engagement with the buoyancy tube 12 and raises the assembly 12 and 14 out of line with end 20 so that as pressure equalizes in the cup 22 the inertia of the buoyant cannister assembly 12 and 14 causes them to separate at joint 70 from tube 16 which remains in the cup 22.

This operation places tubes 12 and 14 in a position to be ejected from the launch mechanism (not shown).

A stationary wire spool 72 is fixedly attached to the submarine cannister tube plate 68 and remains in the launch mechanism until a complete temperature profile has been recorded on the instruments within the submarine. The spool 72, cannister tube 16 and envelope 18 are ejected from the launch mechanism in any convenient manner after the recording of the measurements has been completed.

As shown in FIG. 2, the electrically conductive wire cable 74 is routed in one continuous strand from the spool 72 to the spool 48. From spool 48 the cable 74 is directed through an opening 76 in the release plate 46, along an outside surface of the probe 50 to and through an opening 78 at the rear of the probe, and finally onto a spool 80 within the body of the probe 50. Suitable electrical connections are made to sensor elements 82 in the nose of the probe 50 and to the connector plug 28 thereby providing a continuous electrical connection between the recording instruments (not shown) within the submarine and the sensor elements 82. An epoxy resin or some other suitable material is used to seal the opening 76 so that water cannot enter through that opening into the buoyancy float chambers 32 and 34.

OPERATION OF THE DEVICE

The launching operation will be described in connection with the embodiment of the invention as shown in the drawings. The first step in preparing to launch the probe is to remove the cover 30 from the envelope assembly 18. The envelope assembly containing the tube elements 12, 14 and 16, and the probe 50 is placed in a launching mechanism (not shown) aboard a submarine 90 (FIG. 3) and assembled onto the plug connector 28. The launching mechanism is placed in the submarine's signal ejection tube (not shown) which is subsequently flooded with sea water at ambient pressure. As the water at submarine depth flows through the ports 60 and 62, the auxiliary wire cannister 14 is forced to seat firmly against the opening 44 of the buoyancy tube 12 thereby providing the watertight integrity required for the buoyant float. The water pressure at submarine depth also keeps the valve cap 36 firmly closed while the paper seal 40 dissolves away.

The buoyancy tube 12, carrying the probe 50, and the auxiliary wire cannister 14 are pushed, floated, or otherwise ejected from the envelope assembly 18 and float free from the submarine 90 as shown in FIG. 3. The submarine cannister tube 16 and the envelope assembly 18 remain in the launching mechanism throughout a complete recording exercise.

After the device, comprising the buoyancy tube 12 and the wire cannister tube 14, has been ejected from the launching mechanism, wire cable is unreeled or payed out from the spool 72 in the submarine cannister tube 16 which remains in the launching mechanism aboard the submarine 90. Wire cable is also payed out from the auxiliary wire spool 48 which ascends toward the ocean surface with the buoyancy device. The buoyancy device will ascend toward the ocean surface at a selected rate.

At the surface or at a predetermined release depth, when the pressure of the ambient water substantially equals the internal buoyancy tube pressure, the weight of the probe and the force of the compression spring 54 is great enough to separate the tubes 12 and 14. This also forces the release plate 46 of the wire cannister tube 14 from its seat against the buoyancy tube 12. This causes the buoyancy tube 12 to begin flooding and allows tubes 12 and 14 to separate and the SXBT probe 50 to drop clear of the buoyancy tube and descend by gravity toward the bottom.

The auxiliary wire tube cannister 14, containing the wire spool 48 and the release plate 46 will, after separation from the buoyancy tube 12, descend much more slowly than the SXBT probe 50. The slow sink rate reduces the stress on the wire 74 as it is pulled through the water by the sinking cannister 14.

It should be noted at this point that the use of multiple wire spools in the manner as hereinbefore described reduces the drag effect and tensile stress on the wire 74 that would otherwise be caused by pulling the wire through the water. The reduction of drag by this arrangement permits a more rapid ascendancy of the float device toward the ocean surface. Consequently, a temperature profile extending from near the ocean surface to a great depth can be obtained in a much shorter time than has been heretofore possible with prior art SXBT devices as exemplified by the aforementioned U.S. Pat. No. 3,339,407. In addition, multiple spool SXBT devices can be designed for launch at any submarine operating depth and are not restricted to the limited wire capacity of spool 80 in the probe. Furthermore, a multiple spool SXBT design permits use, without redesign, of an existing XBT probe 50 and wire 74 which can result in considerable savings to the eventual user of SXBT devices.

After the wire cannister tube 14 is separated from the buoyancy tube 12 and the probe 50 falls free of the tube 12, the buoyancy tube will continue to rise toward the ocean surface. At a pressure of approximately 1 to 2 p.s.i. the spring loaded cap 36 opens the chamber 32 to the ambient water allowing the buoyancy tube 12 to flood freely and sink. In the event that the buoyancy tube does reach the surface, its exposure will be only momentary and little disturbance at the ocean surface will be made before the tube 12 sinks from sight.

The addition of the auxiliary wire spool 48 gives the disclosed system increased depth capability.

The foregoing describes a preferred embodiment of the invention and details a preferred method of operation of the SXBT device. It should be understood, however, that the foregoing is merely illustrative and the invention may be embodied and practiced otherwise than as disclosed without departing from the principles described.

What is claimed is:

1. A device for storing and deploying an underwater sensing probe comprising:
    a first storage member including a first half-sleeve section and a second removable half-sleeve section;
    a second storage member removably positioned in said first storage member;
    means mounted in said first storage member for releasably retaining said second storage member within said first member;
    said second storage member having at least two compartments provided therein, one of said compartments being buoyant;
    a sensing probe releasably retained within one of said compartments;
    means in said second storage member responsive to ambient pressure at a predetermined release depth and the buoyancy of the second storage chamber for releasing said second storage member from said first storage member; and
    means within said second storage member for releasing said sensing probe in response to a specific environmental condition.

2. A device as claimed in claim 1 in which said second storage member comprises:
    three coaxially aligned tubular sections, the first of said tubular sections including said one of said compartments for retaining said sensing probe;
    said first tubular section further having a closed end and an open end thereby forming a buoyancy chamber within said first tubular section.

3. A device as claimed in claim 2 wherein:
    the second of said tubular sections is releasably secured at one end thereof to said open end of said first tubular section, said second tubular section being open at each end thereof; and
    said second tubular section further including a plate means diametrically disposed and fixedly secured in sealing contact within said second tubular section intermediate said open ends thereof.

4. A device as claimed in claim 3 wherein:
    the third of said tubular sections is releasably secured at one end thereof to another end of said second tubular section, said third tubular section having one open end adjacent said second tubular section and a closed end.

5. A device as claimed in claim 4 wherein:
    a first wire spool containing a first length of electrically conductive wire is fixedly secured within said third tubular section at said closed end thereof; and
    a second wire spool containing a second length of electrically conductive wire continuous with said first length of wire is fixedly attached to said plate means on the side of said plate facing said first wire spool.

6. A device as claimed in claim 5 wherein said sensing probe includes a third wire spool having wound thereon a third length of wire continuous with said first and second lengths of wire and wherein:
    said one of said compartments for retaining said sensing probe comprises said buoyancy chamber, and said sensing probe is positioned within said chamber with a portion thereof adjacent said plate means.

7. A device as claimed in claim 6 further including:
    compression spring means disposed between said plate means and said probe portion and operable at a predetermined depth to force said plate means and said probe apart and causing said first and second tubular sections to separate thereby freeing said probe to the effects of gravity.

8. A device as claimed in claim 2 wherein said closed end of said first tubular section includes:
    valve means comprising a valve cap movable from a closed position, preventing ambient water from entering said one of said compartments within said first tubular section, to an open position whereby ambient water is allowed to flood said buoyancy chamber; and
    said valve means further including a valve spring operable at a predetermined ocean depth to move said valve cap to an open position.
    said valve means further including a valve spring operable at a predetermined ocean depth to move said valve cap to an open position.

9. A device as claimed in claim 4 wherein said third tubular section includes at least one opening through a side thereof whereby a compartment defined by said plate means and said closed end of said third tubular section may be flooded with water during the deployment.

References Cited

UNITED STATES PATENTS

| | | | |
|---|---|---|---|
| 3,221,556 | 12/1965 | Campbell et al. | 73—170(A) |
| 3,339,407 | 9/1967 | Campbell et al. | 73—170(A) |
| 3,349,613 | 10/1967 | Francis | 73—170(A) |
| 3,520,188 | 7/1970 | Bixby | 73—170(A)X |

CHARLES A. RUEHL, Primary Examiner

M. SMOLLAR, Assistant Examiner

U.S. Cl. X.R.

9—8